United States Patent

Heeman et al.

(10) Patent No.: US 7,533,994 B2
(45) Date of Patent: May 19, 2009

(54) LIGHT SOURCE ARRAY FOR LCD APPLICATIONS

(75) Inventors: Robertus Johannes Heeman, Veldhoven (NL); Jacobus Maria Antonius Eerenbeemd, Nuenen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 449 days.

(21) Appl. No.: 10/571,713

(22) PCT Filed: Sep. 27, 2004

(86) PCT No.: PCT/IB2004/051872

§ 371 (c)(1),
(2), (4) Date: Mar. 10, 2006

(87) PCT Pub. No.: WO2005/031445

PCT Pub. Date: Apr. 7, 2005

(65) Prior Publication Data

US 2006/0274287 A1    Dec. 7, 2006

Related U.S. Application Data

(60) Provisional application No. 60/507,326, filed on Sep. 30, 2003.

(51) Int. Cl.
*G03B 21/14* (2006.01)
(52) U.S. Cl. .......................... 353/38; 353/94; 353/102; 362/800; 362/244
(58) Field of Classification Search .................. 353/38, 353/94, 102; 362/227, 235, 244, 800, 236
See application file for complete search history.

(56) References Cited

U.S. PATENT DOCUMENTS

| | | | |
|---|---|---|---|
| 6,899,435 B2 * | 5/2005 | Yamanaka | 353/94 |
| 6,975,294 B2 * | 12/2005 | Manni et al. | 345/83 |
| 7,270,425 B2 * | 9/2007 | Arai et al. | 353/87 |
| 7,355,800 B2 * | 4/2008 | Anikitchev | 359/710 |
| 7,410,264 B2 * | 8/2008 | Yamasaki et al. | 353/94 |
| 2001/0048560 A1 * | 12/2001 | Sugano | 359/618 |
| 2003/0090900 A1 * | 5/2003 | Kim et al. | 362/231 |

* cited by examiner

*Primary Examiner*—William C Dowling

(57) ABSTRACT

A light source (100) includes a plurality of light emitting devices (101), each of which output light that is collimated by a first focusing structure (103). The collimated light is input to second focusing structure (104), which focuses light from the light emitting devices as a single beam that is substantially homogeneous. The light source may be used in an LCD display, a projection system, a television system, or a computer monitor, to name a few applications.

12 Claims, 1 Drawing Sheet

LIGHT SOURCE ARRAY FOR LCD APPLICATIONS

CROSS REFERENCE TO RELATED CASES

Applicant(s) claim(s) the benefit of Provisional Application Ser. No. 60/507,326, filed Sep. 30, 2003.

Liquid crystal (LC) technology has been applied in projection displays for use in projection televisions, computer monitors, point of sale displays, and electronic cinema to mention a few applications.

In LC display (LCD) devices a light source emits light onto an LC panel, the polarization of the light is selectively altered to produce bright and dark images on a screen. Often the LC material is fabricated over silicon electronic circuitry that is fundamental in the modulation of the LC material. These LC panels are often referred to as liquid crystal on silicon (LCOS) panels.

Many known LCD's include ultra high pressure (UHP) lamps as the source. These sources provide a beam of light that has a relatively homogeneous intensity, which is desirable. To this end, if the light is not homogeneous, the ultimate image is often distorted in brightness, or has a poor resolution, or both. As such, in meeting this need, the UHP lamp has been satisfactory.

However, there are drawbacks to the use of UHP lamps that has lead to the search for other types of light sources for use in LCD applications. For example, the UHP lamps commonly used become exceedingly hot during operation, and require a cooling mechanism. The cooling mechanism as well as the overall size of the UHP lamp increases the size of the LCD device, as well as its complexity. Moreover, use of the UHP lamps can result in loss of the emitted light. Furthermore, UHP lamps often emit ultra-violet (UV) light, which degrades the LC material over time. Furthermore, the life time of solid-state emitters such as light emitting diodes (LED's) can be substantially longer than the current UHP lamps.

In view of at least the above shortcomings of the use of UHP lamps as light sources in LC devices, other light sources have been investigated with mixed success in known structures. One alternate source to the UHP lamp is the light emitting diode (LED) array. The LED is beneficial because it does not suffer from the thermal drawbacks of the UHP devices, and certainly an array of LED's sufficient in number to provide the requisite light intensity for LCD applications is smaller in size than the UHP lamp.

However, it remains a challenge to provide an array of LED's, the output of which, when combined has an etendue that is large enough for LCD applications. Moreover, it also remains a challenge to provide a homogeneous light source from the LED array.

What is needed, therefore, is a light source for LCD applications, which overcomes at least the shortcomings of known devices.

In accordance with an example embodiment, a light source includes a plurality of light emitting devices, each of which output light that is collimated by a first focusing structure. The collimated light is input to second focusing structure, which focuses light from the light emitting devices as a single beam that is substantially homogeneous.

The invention is best understood from the following detailed description when read with the accompanying drawing figures. It is emphasized that the various features are not necessarily drawn to scale. In fact, the dimensions may be arbitrarily increased or decreased for clarity of discussion.

In the following detailed description, for purposes of explanation and not limitation, example embodiments disclosing specific details are set forth in order to provide a thorough understanding of the present invention. However, it will be apparent to one having ordinary skill in the art having had the benefit of the present disclosure, that the present invention may be practiced in other embodiments that depart from the specific details disclosed herein. Moreover, descriptions of well-known devices, methods and materials may be omitted so as to not obscure the description of the present invention.

In accordance with an example embodiment, the combined output of an array of light sources is imaged at an LC panel, producing a substantially homogeneous at the surface of the panel. Moreover, the aspect ratio of the light at the surface of the LC panel is substantially the same as that of the array of light sources. The combined etendue of the individual elements of the array of light source is commensurate with the required etendue of the LCD system.

Optical elements of the example embodiments are chosen to provide the image of the array of light sources at the LC panel in ways described herein. The optical elements chosen to perform the desired function may be geometric lens elements, holographic optical elements (HOE), or other suitable element such as a graded refractive index (GRIN) lens elements within the purview of one having ordinary skill in the art. Moreover, combinations of these elements may be used. Furthermore, the light sources are illustratively light emitting diodes (LED's), such as semiconductor LED's. Of course, this is merely illustrative, and other light sources may be used in conjunction with embodiments. Again, these elements are within the purview of the artisan of ordinary skill in the optical arts.

Figure 1:
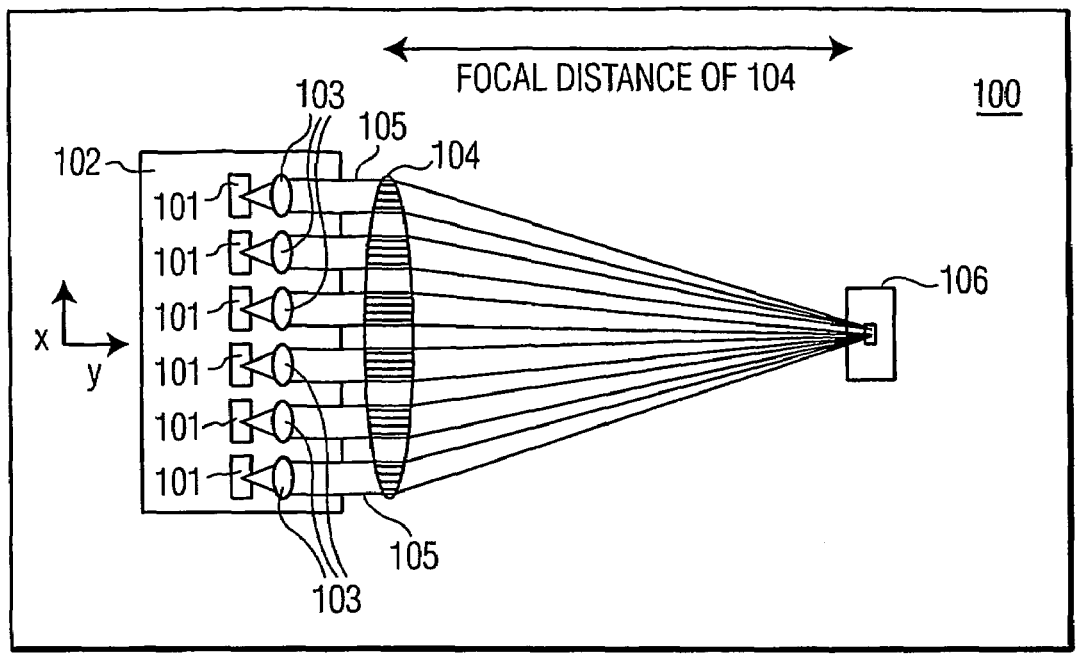
FIG. 1 is a perspective view of a light source and optical components in accordance with an example embodiment.

FIG. 1 shows an optical system 100 in accordance with an example embodiment. The optical system is usefully included in an LCD device. However, the optical system may be used in a projection display system, a direct view LCD system, a television system or a computer monitor, to name a few. It is noted that certain elements of the LCD device that are normally included in the optical system of the LCD device, are not included in FIG. 1 so as to not obscure the description of example embodiments. These include, for example, a polarizing beamsplitter and retarders. The optical system 100 includes an array of light emitting elements 101, which is usefully on a single chip 102. The elements 101 are illustratively LED's, which do not emit light in the UV or IR portion of the optical spectrum. This reduces the long-term damage to the LCD device, and the overall heating of the LCD device, respectively. Moreover, the efficiency of the LED's compared to known UHP lamps eliminates the need for a large power supply, further increasing the benefits of the example embodiments compared to known structures.

The output of each of the LED's 101 is incident on a respective one of an array of optical elements 103. The optical elements 103 are illustratively collimating lens elements, which collimate the diverging output of the LED's 101, as shown. The plurality of collimated light beams 105 is input onto another lens element 104. This lens element focuses each of the beams 105 onto an LC panel 106, which is illustratively an LCOS panel of an LCD device.

As referenced previously, it is useful to provide a substantially homogeneous output at the surface of the LC panel 106. However, the individual LED's are slightly inhomogeneous. Moreover, it is often desired to have an acceptable level of brightness at the surface. In accordance with example embodiments, each of these desired features are readily achieved.

In an example embodiment of the structure of FIG. 1, the light incident on the LCD is substantially homogeneous. This may be achieved by a variety of techniques. One such technique for substantially eliminating the fine structures of the individual LED's 101 to produce a homogeneous beam at the surface of incidence of the LC panel 106 may be achieved by providing a slight misalignment (offset) of the lens elements 103 relative to their respective LED 101. For example, by shifting the lens elements in the ±x and/or ±y-direction shown in FIG. 1, the output of the lens elements 101 results in a desired amount of overlap of the output of each of the plurality of LED's 101. This overlap is replicated at the surface of incidence of the LC panel 106, resulting in substantially homogenized light, and the substantial elimination of the fine structure of each of the LED's 101.

In another example embodiment, the offset of the array of LED's 101 may be realized by rotating 101 relative to one another. For example, the each LED 101 of the chip 102 may be rotated slightly about the z-axis of the coordinate vectors shown. This also provides a degree of overlap of the output of the individual light sources, and results in a light output at the surface of the LC panel 106 that is substantially homogeneous. Any offset or rotation, if great enough, will reduce brightness since it increases the light patch at the panel and light gets lost along the rims of the panel. Assuming a limit of an approximately 10% loss of brightness leads to a rotation of less than 5 degrees. A typical shift in ±x and +y directions of the individual LED's should be smaller than 10% of the source size. A typical shift along the optical axes (z-direction in the example embodiment of FIG. 1) depends on the ratio collimator-diameter to distance collimator-led, where this ratio should not change more than about 5%

Finally, the homogenized light output at the surface of the LC panel 106 may be realized by a slight translation (in the z-direction) of the lens element 103 and/or lens 104. This translation will shift the focal point of the lens 104 to a location in front or behind the surface of the LC device, resulting it the desired defocusing of the images of the LED's, and the consequential homogenization of the light output. Moreover, it is noted that the distortion of and any spherical aberrations in the lens will also contribute to the homogenization of the light.

Before discussing example embodiments drawn to the preservation of the aspect ratio of the light sources 101, it is noted that the various lens elements, in addition to being other types of elements instead of the positive geometric lenses shown in FIG. 1, may also be integrated into one element, or a plurality of elements. For example, the lens elements 103 may be replaced by a suitable single lens element, while the single element 104 may be a replaced by a plurality of lens elements. Moreover, additional elements as needed to effect the homogenization of the light at the surface may be implemented as needed.

In accordance with an example embodiment, the aspect ratio of the emitting surface of the array of LED's 101 is substantially the same as the aspect ratio of the LC panel 106. This ensures that substantially the entire area of the LC panel is illuminated. This in combination with the homogeneity of the light at the LC panel provides clear advantages that are particularly beneficial in LC display devices.

It is noted that the optical system described in connection with the example embodiment of FIG. 1 in many cases provides the smaller areas of illumination of the individual LED's 101 of the array into a larger light emitting area at the output of the lens element 104, and with the correct aspect ratio so the surface of the LC panel is substantially illuminated. However, if this is not achievable in a given LCD device, it is necessary to include other optical elements to achieve the match. To wit, in the case that the LED array is dedicated to the application, the aspect ratio of the individual sources can be made to match that of the panel. But in the case where 'off-the-shelf LED arrays' are used or single LED's are put together into an array, the aspect ratio of the individual sources may be different than that of the panel.

Figure 2A:
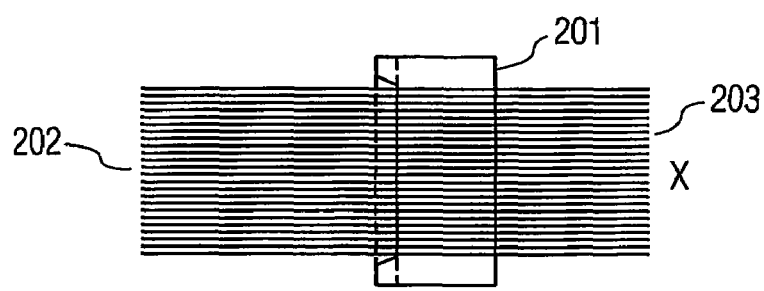
FIG. 2a is a lens element along an x-axis of orientation in accordance with an example embodiment.
Figure 2B:
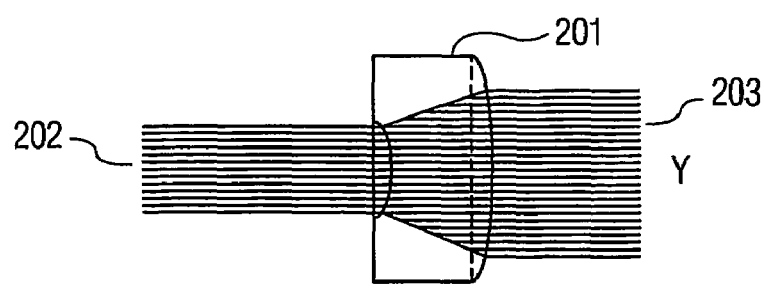
FIG. 2b is a lens element along a y-axis of orientation in accordance with an example embodiment.

One way to provide the desired aspect ratio is using telecentric optics. An exemplary embodiment of the telecentric optics is shown in FIGS. 2a and 2b. The optical element 201 may be used in the illustrative optical system of FIG. 1, with the optical element 201 being disposed between the array of collimators 103 and the lens element 104. The optical element has an angular magnification that is different in the x and y directions (as shown in FIGS. 2a and 2b, respectively), in order to tailor the aspect ratio of the image to match that of the aspect ratio of the LC panel. For purposes of illustration, the magnification in the x-direction (FIG. 2a) is one, and the magnification in the y-direction is some factor M, resulting in a desired aspect ratio at the LC panel surface. In an example embodiment, the optical element is a combination of cylindrical lenses, and M equals the aspect ratio of the panel, and the active area of each individual light source is square. It is noted that the optical element 201 is of a Galileo type system, which is well known to one of ordinary skill in the optical arts. Alternatively, the optical element could be a Kepler-type optical system. Other types of telecentric optical systems could be used. For example, folded reflective systems of the known Cassegrain type may be used.

As is well known, the contrast of the LCD display is dependent on the angle of incidence of the light at the panel. Beneficially, the intensity of the light incident on the panel is the same regardless of the angle of incidence. The use of telescopic arrays can result in either a reduction in the total brightness of the light incident on the panel, or a non-homogeneous intensity distribution that is dependent on the angle of incidence at the panel.

In the example embodiment shown in FIGS. 2a and 2b, light incident from the source side 202 and is incident on the panel side 203, the light intensity at the panel side 203 is homogeneous at all angles of incidence. However, this may be at the expense of lost light (brightness). Contrastingly, if the source side and panel side were switched in FIGS. 2a and 2b, the brightness would be maintained, but at the expense of homogeneity of intensity depending on the angle of incidence.

In an example embodiment of the telescopic optics of FIGS. 2a and 2b, the homogeneity of the intensity is preserved independently of the angle of incidence by arranging the light sources (e.g., array 101) such that the distance ratio of the distance (in x, y) between the light sources is substantially identical to the aspect ratio. As a result, at the source side 202 different beam diameters are coupled in from an array of lenses (e.g., lenses 103), which results in a loss of light (brightness).

In addition to the example embodiments described thus far, other embodiments may be realized through selection of elements and arrangements of elements in various ways. For example, in general, the optical system 100 includes an array of light sources, an array lenses for collimating, and a lens to image the light from the array to of light sources on the panel. Moreover, the telescopic optics may also be included. However, other elements may be used in addition to those referenced above, and such variants would result in further embodiments.

For purposes of illustration, it is noted that the array of light sources (e.g., LED's 101) could be replaced with an integrated light source of similar characteristics. Moreover, the array of collimating lenses (e.g., lens elements 103 could be replaced with an integrated lens element that performs the collimation function. Furthermore, combinations of the above-referenced elements with the imaging lens (e.g., lens element 104) superposed on to the new array as a Fresnel structure could be effected to perform the desired functions. Finally, it is noted that integrated optics could be employed to realize the structures described.

The example embodiments having been described in detail in connection through a discussion of exemplary embodiments, it is clear that modifications of the invention will be apparent to one having ordinary skill in the art having had the benefit of the present disclosure. Such modifications and variations are included in the scope of the appended claims.

The invention claimed is:

1. A light source for use in a liquid crystal display, comprising:
   a plurality of light emitting devices, each of which output light that is collimated by a first focusing structure, wherein the collimated light is input to a telecentric optical element having a first angular magnification in a first direction and a second angular magnification in a second direction perpendicular to the first direction, and the output from the telecentric optical element is input to a second focusing structure, which focuses light from the light emitting devices as a single beam that is substantially homogeneous.

2. A light source as recited in claim 1, wherein the light from the second focusing structure is incident on a liquid crystal panel.

3. A light source as recited in claim 2, wherein the light incident on the panel has substantially of the same intensity independent of its angle of incidence.

4. A light source as recited in claim 2, wherein the ratio of the first angular magnification to the second angular magnification is equal to the aspect ratio of the liquid crystal panel.

5. A projection display system, comprising:
   a light source including a plurality of light emitting devices, each of which output light that is collimated by a first focusing structure, wherein the collimated light is input to a telecentric optical element having a first angular magnification in a first direction and a second angular magnification in a second direction perpendicular to the first direction, and the output from the telecentric optical element is input to a second focusing structure, which focuses light from the light emitting devices as a single beam that is substantially homogeneous.

6. A projection display system as recited in claim 5, wherein the light from the second focusing structure is incident on a liquid crystal panel.

7. A projection display system as recited in claim 6, wherein the light incident on the panel has substantially of the same intensity independent of its angle of incidence.

8. A projection display system as recited in claim 6, wherein the ratio of the first angular magnification to the second angular magnification is equal to the aspect ratio of the liquid crystal panel.

9. A direct view LCD system comprising:
   a light source including a plurality of light emitting devices, each of which output light that is collimated by a first focusing structure, wherein the collimated light is input to a telecentric optical element having a first angular magnification in a first direction and a second angular magnification in a second direction perpendicular to the first direction, and the output from the telecentric optical element is input to a second focusing structure, which focuses light from the light emitting devices as a single beam that is substantially homogeneous.

10. A direct view LCD system as recited in claim 9, wherein the light from the second focusing structure is incident on a liquid crystal panel.

11. A direct view LCD system as recited in claim 10, wherein the light incident on the panel has substantially of the same intensity independent of its angle of incidence.

12. A direct view LCD system as recited in claim 10, wherein the ratio of the first angular magnification to the second angular magnification is equal to the aspect ratio of the liquid crystal panel.

* * * * *